United States Patent
Sengupta et al.

(10) Patent No.: US 8,609,017 B2
(45) Date of Patent: *Dec. 17, 2013

(54) ELECTRONICALLY TUNABLE, LOW-LOSS CERAMIC MATERIALS INCLUDING A TUNABLE DIELECTRIC PHASE AND MULTIPLE METAL OXIDE PHASES

(75) Inventors: Louise C. Sengupta, Warwick, MD (US); Xubai Zhang, Ellicott City, MD (US); Luna H. Chiu, Abingdon, MD (US)

(73) Assignee: BlackBerry Limited, Waterloo, Ontario (CA)

( * ) Notice: Subject to any disclaimer, the term of this patent is extended or adjusted under 35 U.S.C. 154(b) by 476 days.

This patent is subject to a terminal disclaimer.

(21) Appl. No.: 11/707,816

(22) Filed: Feb. 17, 2007

(65) Prior Publication Data
US 2007/0145647 A1    Jun. 28, 2007

Related U.S. Application Data

(62) Division of application No. 10/687,506, filed on Oct. 16, 2003, which is a division of application No. 09/768,690, filed on Jan. 24, 2001.

(51) Int. Cl.
*C04B 35/468* (2006.01)
*C04B 35/47* (2006.01)

(52) U.S. Cl.
USPC ........... 264/614; 264/617; 264/650; 501/137; 501/138; 501/139

(58) Field of Classification Search
USPC ................ 264/650, 614, 617; 501/137–139
See application file for complete search history.

(56) References Cited

U.S. PATENT DOCUMENTS

| | | | | |
|---|---|---|---|---|
| 4,101,952 A * | 7/1978 | Burn | ............................ | 361/305 |
| 5,427,988 A | 6/1995 | Sengupta et al. | ............. | 501/137 |
| 5,635,434 A * | 6/1997 | Sengupta | ....................... | 501/138 |
| 5,819,164 A * | 10/1998 | Sun et al. | ...................... | 455/106 |
| 5,907,470 A * | 5/1999 | Kita et al. | ..................... | 361/311 |
| 6,074,971 A | 6/2000 | Chiu et al. | ..................... | 501/139 |
| 6,377,217 B1 * | 4/2002 | Zhu et al. | .............. | 343/700 MS |
| 6,404,614 B1 * | 6/2002 | Zhu et al. | ...................... | 361/277 |
| 6,514,895 B1 * | 2/2003 | Chiu et al. | .................... | 501/137 |
| 6,621,377 B2 | 9/2003 | Osadchy | | |
| 6,737,179 B2 * | 5/2004 | Sengupta | ..................... | 428/702 |
| 7,056,468 B2 | 6/2006 | Chiu | | |

FOREIGN PATENT DOCUMENTS

| | | |
|---|---|---|
| EP | 0 615 262 A2 | 9/1994 |
| GB | 761307 | 11/1956 |
| WO | WO 00/28613 A1 | 5/2000 |
| WO | WO 01/99224 A1 | 12/2001 |

OTHER PUBLICATIONS

Montgomery, Douglas. Design and Analysis of Experiments. New York:John Wiley & Sons, Inc, 1997.*
U.S. Appl. No. 09/594,837, filed Jun. 15, 2000, Chiu et al.
R.w. Babbitt et al. "Planar Microwave Electro-Optic Phase Shifters", Microwave Journal, Jun. 1992, pp. 63-79.
PCT International Search Report for International Application No. PCT/US02/01856 dated Oct. 7, 2002.
L. Zhou et al. "Electrical Properties of $Sr_{0.7}Ba_{0.3}TiO_3$ Ceramics Doped with $Nb_2O_5$, $3Li_2O$, $2SiO_2$, and $Bi_2O_3$" J. Am. Ceram. Soc., vol. 74, No. 11, pp. 2925-2927 (1991).

* cited by examiner

*Primary Examiner* — Joseph S Del Sole
*Assistant Examiner* — Russell Kemmerle, III
(74) *Attorney, Agent, or Firm* — Guntin & Gust, PLC; Andrew Gust

(57) ABSTRACT

Electronically tunable dielectric materials having favorable properties are disclosed. The electronically tunable materials include an electronically tunable dielectric phase such as barium strontium titanate in combination with at least two additional metal oxide phases. The additional metal oxide phases may include, for example, oxides of Mg, Si, Ca, Zr, Ti and Al. The electronically tunable materials may be provided in bulk, thin film and thick film forms for use in devices such as phased array antennas, tunable filters and the like. The materials are useful in many applications, including the area of radio frequency engineering and design.

26 Claims, No Drawings

ELECTRONICALLY TUNABLE, LOW-LOSS CERAMIC MATERIALS INCLUDING A TUNABLE DIELECTRIC PHASE AND MULTIPLE METAL OXIDE PHASES

CROSS-REFERENCE TO RELATED APPLICATION

This application is a divisional of patent application Ser. No. 10/687,506 entitled, "Electronically Tunable, Low-Loss Ceramic Materials Including A Tunable Dielectric Phase And Multiple Metal Oxide Phases" filed Oct. 16, 2003 by Louise C. Sengupta, which is a divisional of patent application Ser. No. 09/768,690 entitled "Electronically Tunable, Low-Loss Ceramic Materials Including A Tunable Dielectric Phase And Multiple Metal Oxide Phases", filed Jan. 24, 2001.

FIELD OF THE INVENTION

The present invention relates to electronically tunable ceramic materials which have favorable properties for many applications, including the area of radio frequency (RF) engineering and design. More particularly, the present invention relates to electronically tunable ceramic materials comprising a tunable dielectric phase such as barium strontium titanate (BSTO) in combination with multiple metal oxide phases.

BACKGROUND INFORMATION

Microwave devices such as electronically scanning antennas, phased array antennas, electronic down tilt antennas, electronically tunable filters, electronically tunable radar and tunable oscillators have been proposed for use, but their high costs have prevented widespread commercial implementation. The existence of low cost tuning technology would revolutionize the industry of microwave components and antennas.

Tuning refers to the ability to change the dielectric constant of a material. This translates in the microwave component field as the ability to use the same component and change the frequency of operation by changing the input voltage or current. It can allow for a single filter to frequency-hop during operation. For antennas, being able to tune using low cost technology would create a new class of phased array antennas, which could be used in common households instead of being limited to large, expensive systems. Phased array antennas can be described as electronically scanning antennas. By using electronically scanning antennas, satellite communications can be available in many situations, because the antennas would allow for tracking of a satellite. This means voice and data communications can be done in a mobile arena. Also, mobile communications would be available at a global level without the need for major infrastructure.

A phased array refers to an antenna configuration composed of a large number of elements that emit phased signals to form a radio beam. The radio signal can be electronically steered by the active manipulation of the relative phasing of the individual antenna elements. This electronic beam steering concept applies to both the transmitter and the receiver. Phased array antennas are advantageous in comparison to their mechanical counterparts with respect to their speed, accuracy and reliability. The replacement of gimbal mounted mechanical antennas by phased array antennas increases survivability through more rapid and accurate target identification. For example, complex tracking exercises can be performed rapidly and accurately with a phased array antenna system.

Future communications will also require wideband communications using frequency-hopping techniques, so that large amounts of digital data can be transferred over the band. A critical component for these applications is a low cost, fast acting tunable filter. Digital data could be distributed or encoded over a band of frequencies in a sequence determined by control circuitry of the tunable filter. This would allow for several users to transmit and receive over a common range of frequencies.

Technologies for scanning that could possibly be adapted for phase shifter applications are ferrite phase shifters and semiconductor diode phase shifters. Although ferrites are currently the most widely used type of phase shifter materials, they are mostly limited to military applications. The major reason for this is that they are very expensive to manufacture. Secondary reasons include the fact that they are not designed to work in a broadband situation. When the frequency changes, a new set of materials has to be designed and manufactured. They are also very bulky in size and heavy. Furthermore, such phase shifters are difficult or impossible to make in a planar configuration. Conventional ferrites are also driven by high power due to the fact that they activate based on current.

Conventional diode phase shifters are also high cost because they require active electronic circuits to be added to designs in order to compensate for their high loss at microwave frequencies. They do not have good power handling characteristics. When power is put through the diodes, they start to behave in a very non-linear fashion, or they break down. Diodes also require holding power in order to maintain accuracy, as well as power during switching.

Barium titanate is one of the known ceramics tunable at room temperature. Another known tunable ceramic is strontium titanate. However, this material by itself must be super cooled in order to have usable tuning characteristics. Other tunable dielectrics include lead zirconium titanates (PZT), lead lanthanum zirconium titanates (PLZT), $PbTiO_3$, $KNbO_3$, $LaTaO_3$, $BaCaZrTiO_3$, $NaNO_3$ and other ferroelectric perovskites. The problem with these known ferroelectrics is that their losses are very high at room temperature. This makes these materials essentially useless at microwave frequencies. One way to combat this problem is by means of producing a low loss but still tunable composite material with reasonable dielectric constants.

Barium strontium titanate (BSTO) has been used for its high dielectric constant, on the order of 200 to 6,000, and its large change in dielectric constant with applied voltage, on the order of 25 to 75 percent at a field of 2V/micron. Some prior art ferroelectric composite materials which include BSTO are disclosed in U.S. Pat. No. 5,427,988 to Sengupta et al. entitled "Ceramic Ferroelectric Composite Material BSTO-MgO"; U.S. Pat. No. 5,645,434 to Sengupta et al. entitled "Ceramic Ferroelectric Composite Material BSTO-Magnesium Based Compound"; U.S. Pat. No. 6,074,971 to Chiu et al. entitled "Ceramic Ferroelectric Composite Materials with Enhanced Electronic Properties BSTO-Mg Based Compound—Rare Earth Oxide"; and U.S. patent application Ser. No. 09/594,837 to Chiu et al. filed Jun. 15, 2000 entitled "Electronically Tunable Ceramic Materials Including Tunable Dielectric and Metal Silicate Phases", each of which is incorporated herein by reference.

The idea of a voltage tunable dielectric has been proposed for use in antenna applications in a paper entitled "Planar Microwave Electro-Optic Phase Shifters", *Microwave Journal*, Volume 35 (6), June 1992. There is a need for new materials which have desirable electronic properties in order to make this possible. As with most ferroelectrics which are tunable at room temperature, the losses at frequencies above 600 MHz become too high to use cost effectively. Also, high dielectric constants makes it virtually impossible to integrate and match them to RF circuits. This causes increased insertion losses.

The present invention has been developed in view of the foregoing, and to address other deficiencies of the prior art.

SUMMARY OF THE INVENTION

The present invention provides electronically tunable ceramic materials. The materials comprise at least one tunable dielectric phase selected from barium titanate, strontium titanate, barium strontium titanate, lead titanate, lead zirconium titanate, lead lanthanum zirconium titanate, potassium niobium oxide, lanthanum tantalum oxide, barium calcium zirconium titanate, sodium nitrate and other electronically tunable ferroelectrics. A preferred tunable dielectric phase comprises barium strontium titanate of the formula $Ba_xSr_{1-x}TiO_3$. In the formula $Ba_xSr_{1-x}TiO_3$, x can be a value from 0 to 1, preferably from about 0.15 to about 0.6.

The present electronically tunable ceramic materials also include multiple metal oxide phases in an amount up to about 80 weight percent of the material. The additional metal oxide phases are used to control the microwave properties, e.g., by reducing the loss tangents and dielectric constants, while maintaining tunability and improving temperature stability. The additional metal oxide phases provide substantially improved characteristics, for example, substantially increased tuning while exhibiting low insertion losses, making the materials useful as tunable dielectrics for microwave applications. The materials also exhibit improved temperature stability, biasing and response time in comparison with conventional materials. Also, the additional metal oxide materials allow the dielectric constant of the tunable dielectric phase, e.g., BSTO, to be adjusted to the desired levels while maintaining tunability. The significant improvements in tunability, stability and adjustibility of dielectric constant without degradation of electric loss enable new RF/microwave applications.

The materials are highly advantageous for microwave component designs because their tuning characteristics allow for the construction of devices having variable properties. Such variable properties allow for new designs, e.g., for filters which can vary the frequency of operation and allow for frequency-hopping of microwave devices, and for antennas to scan and track satellites electronically, as well as many other applications. The electronic properties of the present materials can be adjusted or tailored for a specific microwave application or design. Tunable materials with very low loss insertion are provided. In addition, the materials can be readily used in a wide range of frequencies, e.g., from 100 kHz to 60 GHz. Since the preferred materials require voltage changes in order to switch, very low current and power requirements are achieved. The materials may be provided in many different manufacturable forms such as bulk ceramics, thick films, and thin films.

An aspect of the present invention is to provide an electronically tunable dielectric material including at least one tunable dielectric phase and at least two additional metal oxide phases.

Another aspect of the present invention is to provide a method of forming an electronically tunable dielectric material. The method includes the steps of mixing particles of at least one tunable dielectric material and particles of at least two additional metal oxides, followed by sintering.

These and other aspects of the present invention will be more apparent from the following description.

DETAILED DESCRIPTION

The present electronically tunable ceramic compositions comprise at least one electronically tunable dielectric phase, such as barium strontium titanate, in combination with at least two additional metal oxide phases. Barium strontium titanate of the formula $Ba_xSr_{1-x}TiO_3$ is a preferred electronically tunable dielectric material due to its favorable tuning characteristics, low curie temperatures and low microwave loss properties. In the formula $Ba_xSr_{1-x}TiO_3$, x can be any value from 0 to 1, preferably from about 0.15 to about 0.6. More preferably, x is from 0.3 to 0.6.

Other electronically tunable dielectric materials may be used partially or entirely in place of barium strontium titanate. An example is $Ba_xCa_{1-x}TiO_3$, where x can vary from about 0.2 to about 0.8, preferably from about 0.4 to about 0.6. Additional electronically tunable ferroelectrics include $Pb_xZr_{1-x}TiO_3$ (PZT) where x ranges from about 0.05 to about 0.4, lead lanthanum zirconium titanate (PLZT), lead titanate ($PbTiO_3$), barium calcium zirconium titanate ($BaCaZrTiO_3$), sodium nitrate ($NaNO_3$), $KNbO_3$, $LiNbO_3$, $LiTaO_3$, $PbNb_2O_6$, $PbTa_2O_6$, $KSr(NbO_3)$ and $NaBa_2(NbO_3)5$ $KH_2PO_4$.

In addition to the electronically tunable dielectric phase, the present electronically tunable materials include at least two additional metal oxide phases. The additional metal oxides may include metals from Group 2A of the Periodic Table, i.e., Mg, Ca, Sr, Ba, Be and Ra, preferably Mg, Ca, Sr and Ba. The additional metal oxides may also include metals from Group 1A, i.e., Li, Na, K, Rb, Cs and Fr, preferably Li, Na and K. Metals from other Groups of the Periodic Table may also be suitable constituents of the metal oxide phases. For example, refractory metals such as Ti, V, Cr, Mn, Zr, Nb, Mo, Hf, Ta and W may be used. Furthermore, metals such as Al, Si, Sn, Pb and Bi may be used. In addition, the metal oxide phases may comprise rare earth metals such as Sc, Y, La, Ce, Pr, Nd and the like.

The additional metal oxides may include, for example, zirconnates, silicates, titanates, aluminates, stannates, niobates, tantalates and rare earth oxides. Preferred additional metal oxides include $Mg_2SiO_4$, MgO, $CaTiO_3$, $MgZrSrTiO_6$, $MgTiO_3$, $MgAl_2O_4$, $WO_3$, $SnTiO_4$, $ZrTiO_4$, $CaSiO_3$, $CaSnO_3$, $CaWO_4$, $CaZrO_3$, $MgTa_2O_6$, $MgZrO_3$, $MnO_2$, PbO, $Bi_2O_3$ and $La_2O_3$. Particularly preferred additional metal oxides include $Mg_2SiO_4$, MgO, $CaTiO_3$, $MgZrSrTiO_6$, $MgTiO_3$, $MgAl_2O_4$, $MgTa_2O_6$ and $MgZrO_3$.

The additional metal oxide phases are typically present in total amounts of from about 1 to about 80 weight percent of the material, preferably from about 3 to about 65 weight percent, and more preferably from about 5 to about 60 weight percent. In a particularly preferred embodiment, the additional metal oxides comprise from about 10 to about 50 total weight percent of the material. The individual amount of each additional metal oxide may be adjusted to provide the desired properties. Where two additional metal oxides are used, their weight ratios may vary, for example, from about 1:100 to about 100:1, typically from about 1:10 to about 10:1 or from about 1:5 to about 5:1. Although metal oxides in total amounts of from 1 to 80 weight percent are typically used, smaller additive amounts of from 0.01 to 1 weight percent may be used for some applications.

In one embodiment, the additional metal oxide phases may include at least two Mg-containing compounds. In addition to the multiple Mg-containing compounds, the material may optionally include Mg-free compounds, for example, oxides of metals selected from Si, Ca, Zr, Ti, Al and/or rare earths. In another embodiment, the additional metal oxide phases may include a single Mg-containing compound and at least one Mg-free compound, for example, oxides of metals selected from Si, Ca, Zr, Ti, Al and/or rare earths.

As used herein, the term "electronically tunable dielectric material" means a material that exhibits a variable dielectric constant upon the application of a variable voltage. The term "voltage tunable dielectric material" as used herein means a material that exhibits a variable dielectric constant with a variable applied voltage. The tunability may be defined as the dielectric constant of the material with an applied voltage divided by the dielectric constant of the material with no applied voltage. Thus, the voltage tunability percentage may be defined by the formula:

$$T=((X-Y)/X)\cdot 100;$$

where X is the dielectric constant with no voltage and Y is the dielectric constant with a specific applied voltage. High tunability is desirable for many applications. For example, in the case of waveguide-based devices, the higher tunability will allow for shorter electrical length, which means a lower insertion loss can be achieved in the overall device. Higher tunability will result in a large angle of sweep at lower operation voltages. The present voltage tunable dielectric materials preferably exhibit a tunability of at least about 20 percent at 8V/micron, more preferably at least about 25 percent at 8V/micron. For example, the voltage tunable dielectric material may exhibit a tunability of from about 30 to about 75 percent or higher at 8V/micron. The tunability of the present materials comprising multiple additional metal oxide phases has been found to be superior to binary composite materials.

In accordance with the present invention, the combination of tunable dielectric materials such as BSTO with additional metal oxides allows the materials to have high tunability, low insertion losses and tailorable dielectric properties, such that they can be used in microwave frequency applications. The materials demonstrate improved properties such as increased tuning, reduced loss tangents, reasonable dielectric constants for many microwave applications, stable voltage fatigue properties, higher breakdown levels than previous state of the art materials, and improved sintering characteristics. A particular advantage of the present materials is that tuning is dramatically increased compared with conventional low loss tunable dielectrics. The tunability and stability achieved with the present materials enables new RF applications not previously possible. A further advantage is that the materials may be used at room temperature. The electronically tunable materials may be provided in several manufacturable forms such as bulk ceramics, thick film dielectrics and thin film dielectrics.

The dielectric constants of the present materials preferably range from about 15 to 1,500, and may be tailored to a particular application. In many cases, a lower dielectric constant on the order of 100 is needed for ease of matching into the circuit. A lower dielectric constant is preferable for waveguides so that impedance matching is easier. In other cases, such as varactor based filters, a higher dielectric constant such as 300 to 400 may be needed to achieve the correct capacitance required for a specific frequency band. For some RF applications, such as delay lines, very high dielectric constants, e.g., 800 to 1,000, are needed to obtain the correct delay.

The loss tangent is a measure of the dissipation of microwave energy in a device and can be defined as ,"/,. Lower loss tangents are usually desirable. Depending on the frequency of an application, usable loss tangents are usually below 0.04. If low loss tangent at high microwave frequencies can be achieved, cheaper devices may be provided because there is no need for active amplification of signals. The addition of the metal oxide phases in the present materials decreases the insertion loss substantially. Losses at 10 GHz in many cases are below 0.02, and for some compositions the loss at 24 GHz is below the 0.04 level.

In addition to these electronic properties, there are other advantages to the present compositions. The present materials exhibit better temperature stability compared with binary composites. These materials also show a good resistance to breakdown even at high electrical field. For example, several of the present compositions have been held at 9V/micron for several days without breakdown.

Another advantage is that with the addition of multiple oxide phases, the tuning remains almost the same while the dielectric loss is decreased from that of the two-phase composite. In addition, the dielectric constant of the ternary composites can be adjusted without decreasing tuning and increasing dielectric loss, which enable new RF applications not previously possible.

In accordance with an embodiment of the present invention, at RF frequencies, the dielectric constant of $Ba_xSr_{1-x}TiO_3$ can be decreased to usable values for microwave designs. The present materials also decrease the loss of the baseline BSTO materials such that these ceramics can now be considered for passive device designs at higher frequencies such as 600 MHz and above. The tunability of these materials is also maintained from the baseline BSTO materials. Tuning characteristics for these materials is much better than that of the current state of the art.

The present materials may also exhibit a more linear increase in tuning compared with the current state of the art materials. These materials also show a good resistance to breakdown even at high voltages. For example, several different compositions have been held at 9V/micron for several days without exhibiting any changes. Also, cycling tests have shown that the tuning of these materials may fall within a +/−1% value for 1,000 cycles or more.

The present materials are also very robust because compositions produced from lower purity commercial grade materials have been found to possess electronic properties very similar to samples made from high purity materials. The production of these compositions using starting powders from several different manufacturers exhibit electronic properties within acceptable standard deviations. The present materials can also be processed in water, which saves cost and is more environmentally sound than solvent processing.

The present materials can be produced by conventional manufacturing processes. For example, powder forms of $BaTiO_3$ and $SrTiO_3$ may be mixed to form the desired stiochiometry of the electronically tunable dielectric phase. The powders may be ball-milled in either a liquid solvent or deionized water, or dry mixed with ceramic grinding media for approximately 24 hours. These powders are then allowed to dry. The mixed powder is then calcined at temperatures of from about 800° C. to about 1,200° C. to form BSTO. The calcined powder may then undergo another mixing step with powders of the additional metal oxide phases in the desired ratios to form the composite. This mixing step may be performed in a liquid medium or dry. During mixing conventional binders may or may not be added. The tunable dielectric phase and the additional metal oxide phases preferably have an average particle size of from about 0.1 to about 5 micron, more preferably from about 1.5 to about 2.5 micron. After mixing, the composite powder is then dried and ground to a workable particle size. At this point the powder may be made into several different forms that can be characterized as bulk materials, thick films or thin films.

The composite powder made using the above specifications may be compacted to form a shape. This process can be performed by isostatic pressing, uniaxial pressing or the like. The green ceramic body is then fired at the appropriate temperature in order to densify the compact. Electrodes may be placed on the sintered ceramic via a hybrid or thin film method to the specifications of a desired design.

The composite powder may also be blended with a polymeric binder for tape casting. The tape casting slurry may be pumped into a tape caster with a doctor blade set for a desired thickness. As the caster moves a carrier sheet such as Mylar under the doctor blade, the slurry forms a film of the desired for the desired device. For example, in the case of varactors, over one hundred varactors can be put on a single chip and diced out for placement into microwave devices.

The fabrication processes primarily described herein deal with the production of bulk materials and thick film slurries. However, other suitable processing methods include die casting, injection molding, uniaxial pressing, isostatic pressing, tape casting, roll compaction and the like.

Electronic properties of some of the materials of the present invention are shown in Tables 1-5. The properties achieved in accordance with the present invention are significant because the material maintains high tuning with low microwave losses with the addition of the multiple oxide phases. The dielectric constant of the composite is readily tailorable. The composite also has high breakdown voltages.

TABLE 1

Low and High Frequency Data of BSTO with varying Amounts $Mg_2SiO_4$ and MgO

| BSTO/ $Mg_2SiO_4$/ MgO | Dielectric Constant (1 MHz) | Dielectric Loss (1 MHz) | Dielectric Constant (10 GHz) | Dielectric Loss (10 GHz) | Dielectric Constant (24 GHz) | Dielectric Loss (24 GHz) | Tunability (2 V/um) (%) | Tunability (4 V/um) (%) | Tunability (6 V/um) (%) | Tunability (8 V/um) (%) |
|---|---|---|---|---|---|---|---|---|---|---|
| 35.1005 | 503.2 | 0.0011 | | | 396.2 | 0.0132 | 4.2 | 8.8 | 12.2 | |
| 35.2005 | 374.1 | 0.0010 | | | 300.6 | 0.0187 | 3.6 | 8.7 | 13.2 | |
| 35.3005 | 245.9 | 0.0008 | | | 213.0 | 0.0103 | 3.03 | 9.1 | | |
| 40.2005 | 427.4 | 0.00065 | | | 344.0 | 0.0148 | 6.0 | 13.1 | 18.5 | |
| 40.3005 | 252.9 | 0.0008 | | | 250.0 | 0.0145 | 6.5 | 14.1 | 20.0 | |
| 40.6005 | 43.7 | 0.004 | | | 40.2 | 0.0153 | 3.4 | 7.8 | 11.7 | 15.2 |
| 45.2005 | 518.9 | 0.001 | | | 425.8 | 0.0206 | 8.1 | 17.2 | 23.9 | |
| 45.5001 | 129.7 | 0.0013 | 107.16 | 0.0155 | 106.2 | 0.0224 | 7.3 | 17.7 | 25.3 | 31.3 |
| 45.5002 | 134.4 | 0.0015 | | | 114.4 | 0.0191 | 9.3 | 18.2 | 25.0 | 30.9 |
| 45.5003 | 133.1 | 0.0033 | | | 129.6 | 0.0201 | 7.9 | 16.6 | 23.7 | 29.4 |
| 45.5005 | 111.8 | 0.00286 | | | 100.6 | 0.019 | 9.5 | 17.5 | 23.8 | 29.3 |
| 45.5501 | 96.0 | 0.0013 | 80.99 | 0.0118 | 78.4 | 0.0232 | 6.7 | 16.2 | 23.7 | 29.3 |
| 45.5502 | 99.0 | 0.0024 | | | 68.2 | 0.0266 | 7.8 | 15.5 | 22.1 | 27.9 |
| 45.5503 | 90.6 | 0.0021 | | | 77.7 | 0.0178 | 7.0 | 15.8 | 23.0 | 29.1 |
| 45.5505 | 101.9 | 0.0023 | | | 71.5 | 0.0162 | 10.0 | 18.1 | 24.8 | 30.2 |
| 50.2005 | 637.5 | 0.0008 | | | 532.8 | 0.0359 | 12.0 | 24.2 | 33.0 | |
| 50.3005 | 460.6 | 0.0008 | | | 373.3 | 0.0357 | 13.5 | 26.9 | 36.0 | |
| 50.4005 | 268.8 | 0.0006 | | | 243.1 | 0.0353 | 13.4 | 25.7 | 34.3 | |
| 55.4001 | 400.6 | 0.00116 | | | 362.5 | 0.0734 | 26.2 | 41.8 | 52.5 | 59.9 |
| 55.4005 | 437.9 | 0.00158 | 404.9 | 0.0243 | 362.5 | 0.0395 | 24.8 | 42.2 | 52.5 | 59.7 |
| 55.0160 | 102.1 | 0.002 | | | 88.0 | 0.0165 | 11.2 | 17.6 | 22.6 | |
| 55.0560 | 114.9 | 0.0021 | | | 92.8 | 0.0244 | 9.8 | 18.0 | 24.4 | 30.1 |
| 55.1060 | 98.4 | 0.0019 | | | 78.0 | 0.0254 | 10.1 | 18.4 | 24.4 | 29.5 |
| 45.55* | 81.3 | 0.0014 | | | 79.4 | 0.0185 | 4.8 | 12.4 | 18.9 | 24.1 |
| 55.60** | 99.8 | 0.0011 | | | 84.6 | 0.0188 | 6.9 | 13.4 | 18.4 | 22.8 |

*45 wt. % $Ba_{0.45}Sr_{0.55}TiO_3$ and 55 wt. % $Mg_2SiO_4$
**40 wt. % $Ba_{0.55}Sr_{0.45}TiO_3$ and 60 wt. % MgO thickness. The film is allowed to dry and then it is cut and/or slit to the shape needed. This green body is then fired with the appropriate binder burn out schedule. The sintered part may undergo an annealing stage dependent upon the quality of the fired tape. The tapes can then be electroded in a manner similar to the bulk material.

Alternatively, the composite powder can be mixed with a polymeric binder for screen printing. The slurry may be gently blended and then placed in a 3-roll mill or attritor mill to thoroughly mix the slurry. The ceramic ink is then printed using a screen with the appropriate mesh and emulsion for the desired finished print thickness. The ceramic may be printed onto any suitable substrate, e.g., a ceramic substrate such as MgO. The films are then metallized with a pattern necessary The compositional designations for the materials listed in Tables 1-5 mean the weight percentage of three different phases. For example, the designation 35.1005 BSTO/$Mg_2SiO_4$/MgO means that the sample contains 5 wt. % MgO and 95 wt. % BSTO/$Mg_2SiO_4$. In the 35.1005 sample, $Mg_2SiO_4$ comprises 10 wt. % of the total of the BSTO/$Mg_2SiO_4$, and the barium strontium titanate comprises 90 wt. % of the BSTO/$Mg_2SiO_4$. The barium strontium titanate phase of the 35.1005 sample has the formula $Ba_{0.35}Sr_{0.65}TiO_3$. In addition to the ternary BSTO/$Mg_2SiO_4$/MgO compositions, Table 1 includes two binary BSTO/$Mg_2SiO_4$ (Sample No. 45.55) and BSTO/MgO (Sample No. 55.60) compositions for comparison purposes. The ternary compositions exhibit favorable properties in comparison with the binary compositions.

TABLE 2

Low and High Frequency Data of BSTO with varying Amounts of CaTiO₃ and Mg₂SiO₄

| BSTO/ CaTiO₃/ Mg₂SiO₄ | Dielectric Constant (1 MHz) | Dielectric Loss (1 MHz) | Dielectric Constant (10 GHz) | Dielectric Loss (10 GHz) | Dielectric Constant (24 GHz) | Dielectric Loss (24 GHz) | Tunability (2 V/um) (%) | Tunability (4 V/um) (%) | Tunability (6 V/um) (%) | Tunability (8 V/um) (%) |
|---|---|---|---|---|---|---|---|---|---|---|
| 45.1010 | 802.0 | 0.0008 | 800.4 | 0.0050 | 591.5 | 0.0231 | 5.0 | 14.5 | 2.04 | 32.8 |
| 45.1020 | 579.3 | 0.0009 | | | 462.2 | 0.0244 | 4.8 | 14.8 | 25.0 | 33.6 |
| 45.1030 | 395.6 | 0.0009 | 411.3 | 0.0134 | 333.2 | 0.0240 | 5.2 | 15.3 | 25.0 | 33.1 |
| 45.1040 | 249.4 | 0.0005 | 261.1 | 0.0092 | 213.1 | 0.0245 | 5.6 | 15.8 | 25.2 | 32.8 |
| 45.1050 | 163.5 | 0.0006 | 162.1 | | 137.9 | 0.0230 | 4.5 | 15.1 | 23.8 | 31.0 |
| 45.1060 | 85.3 | 0.0001 | 87.2 | 0.0064 | 73.51 | 0.0181 | 3.8 | 11.8 | 18.1 | 24.0 |
| 45.2020 | 449.7 | 0.0021 | 408.7 | 0.0632 | | | 8.9 | 16.4 | 37.0 | 43.8 |
| 45.2030 | 319.8 | 0.0018 | 377.4 | 0.0613 | | | 6.7 | 22.8 | 33.8 | 41.0 |
| 45.2040 | 225.5 | 0.0027 | 165.0 | 0.0517 | 146.6 | 0.068 | 7.2 | 20.6 | 30.1 | |
| 50.1040 | 317.9 | 0.0008 | 356.5 | 0.017 | 269.1 | 0.0334 | 9.5 | 24.3 | 35.7 | 43.9 |
| 50.2040 | 242.9 | 0.0031 | 177.6 | 0.0640 | 154.0 | 0.082 | 7.2 | 22.5 | 33.2 | 42.0 |
| 55.1020 | 896.9 | 0.001 | 853.8 | 0.043 | 643.3 | 0.0495 | 15.2 | 33.9 | 46.2 | 55.0 |
| 55.1040 | 396.0 | 0.0011 | 401.6 | 0.028 | 316.1 | 0.054 | 15.2 | 33.8 | 45.8 | 53.6 |
| 55.2010 | 872.6 | 0.0024 | | | 548.1 | 0.259 | 15.9 | 38.5 | 51.1 | |
| 55.2020 | 596.6 | 0.0032 | | | 430.2 | 0.133 | 19.4 | 41.3 | 52.6 | 59.4 |
| 55.2040 | 266.0 | 0.0023 | | | 197.3 | 0.1029 | 6.5 | 25.4 | 37.6 | 45.6 |
| 55.2050 | 133.5 | 0.0029 | 108.3 | 0.0561 | 98.9 | 0.068 | 4.3 | 17.8 | 27.4 | |
| 55.2060 | 65.85 | 0.0015 | 53.1 | 0.0362 | 63.5 | 0.106 | 2.2 | 9.0 | 15.6 | |
| 55.2070 | 29.2 | 0.0005 | 25.9 | 0.0190 | 13.8 | 0.157 | 0.3 | 2.4 | 4.8 | |

TABLE 3

Low and High Frequency Data of BSTO with varying Amounts of MgZrSrTiO₆ and MgO

| BSTO/ MgZrSrTiO₆/ MgO | Dielectric Constant (1 MHz) | Dielectric Loss (1 MHz) | Tunability (2 V/um) (%) | Dielectric Constant (100 MHz) | Dielectric Loss (100 MHz) | Dielectric Constant (10 GHz) | Dielectric Loss (10 GHz) |
|---|---|---|---|---|---|---|---|
| 55.3030 | 286.0 | 0.00066 | 19.1 | 223 | 0.00168 | 311.2 | 0.035 |
| 55.3050 | 80.6 | 0.00044 | 6.5 | | | 74.2 | 0.0106 |
| 55.3060 | 49.9 | 0.00099 | 3.4 | | | 47.1 | 0.0081 |

TABLE 4

Low and High Frequency Data of BSTO with varying Amounts of MgTiO₃ and MgO

| BSTO/ MgTiO₃/ MgO | Dielectric Constant (1 MHz) | Dielectric Loss (1 MHz) | Tunability (2 V/um) (%) | Dielectric Constant (100 MHz) | Dielectric Loss (100 MHz) | Dielectric Constant (10 GHz) | Dielectric Loss (10 GHz) |
|---|---|---|---|---|---|---|---|
| 55.3020 | 460.0 | 0.00068 | 22.0 | 372.0 | 0.00186 | 364.0 | 0.022 |
| 55.3030 | 265.0 | 0.00084 | 14.9 | | | 283.8 | 0.0275 |
| 55.3050 | 72.8 | 0.00046 | 5.5 | | | 68.3 | 0.013 |
| 55.3060 | 43.8 | 0.00088 | 2.4 | | | 45.1 | 0.0077 |

TABLE 5

Low and High Frequency Data of BSTO with varying Amounts of MgAl₂O₄ and MgO

| BSTO/ MgO/ MgAl₂O₄ | Dielectric Constant (1 MHz) | Dielectric Loss (1 MHz) | Tunability (2 V/um) (%) | Tunability (8 V/um) (%) | Dielectric Constant (10 GHz) | Dielectric Loss (10 GHz) |
|---|---|---|---|---|---|---|
| 55.2020 | 336.4 | 0.00097 | 8.1 | | | |
| 55.3030 | 108.2 | 0.00089 | 8.0 | | 97.6 | 0.0201 |
| 55.2535 | 97.2 | 0.00086 | 6.3 | 27.9 | | |
| 55.0560 | 106.2 | 0.00061 | 4.7 | | | |
| 55.1060 | 90.1 | 0.00057 | 4.8 | | 96.4 | 0.0177 |
| 55.2060 | 64.2 | 0.0006 | 4.6 | | | |
| 55.3060 | 53.0 | 0.00062 | 4.4 | | | |
| 55.6001 | 155.0 | 0.006 | 34.3 | | | |
| 55.6020 | 69.5 | 0.0015 | 11.0 | | 57.3 | 0.029 |
| 55.6025 | 47.3 | 0.00098 | 6.2 | 20.4 | | |
| 55.6030 | 41.5 | 0.001 | 3.9 | | | |
| 60.2515 | 439.0 | 0.0018 | 18.0 | | | |
| 60.0160 | 185.1 | 0.0026 | 17.8 | 50.7 | | |

As shown in Tables 1-5, the dielectric constant can be tailored by changing the percentage of one phase while maintaining the tunability and dielectric loss. An example of this is shown in Table 1, where changing the percentage of the $Mg_2SiO_4$ phase in the $BSTO/Mg_2SiO_4/MgO$ ternary material changed the 24 GHz dielectric constant of samples 50.2005, 50.3005 and 50.4005 from 532.8 to 373.3 to 243.1, respectively. The tunability and 24 GHz loss tangent of 50.2005, 50.3005 and 50.4005 remain the same. For different RF applications, certain dielectric constants may be desired. The ternary composites make it possible to engineer the material with the desired dielectric constant without changing the dielectric loss and tunability.

Another significant improvement shown in Tables 1-5 is that the materials can also be designed to keep the dielectric constant and tunability the same while decreasing the dielectric loss, which is not exhibited by binary composites. As an example, in Table 1, the 24 GHz dielectric loss tangent of 55.4001 and 55.4005 has been reduced almost by half by changing the percentage of MgO phase in $BSTO/Mg_2SiO_4/MgO$ composite, but the dielectric constant and tunability remain the same.

The present materials exhibit favorable voltage handling characteristics. The materials preferably withstand very high fields and voltages without structural or ionic breakdowns. An example of this characteristic is shown in Table 6 under an 8V/micron amplified field.

TABLE 6

Voltage Handling Characteristics over Time of BSTO Ternary Composites

| | Time (minutes) | | | | | | | | | | |
|---|---|---|---|---|---|---|---|---|---|---|---|
| | 30 | 60 | 120 | 180 | 240 | 300 | 360 | 420 | 480 | 600 | 960 |
| Leakage Current (mA) $Ba_{.55}Sr_{.45}TiO_3 + Mg_2SiO_4 + CaTiO_3$ | 0.000 | 0.000 | 0.000 | 0.000 | 0.000 | 0.000 | 0.000 | 0.000 | 0.000 | 0.000 | 0.000 |
| Leakage Current (mA) $Ba_{.55}Sr_{.45}TiO_3 + Mg_2SiO_4 + MgO$ | 0.000 | 0.000 | 0.000 | 0.000 | 0.000 | 0.000 | 0.000 | 0.000 | 0.000 | 0.000 | 0.000 |

The zero leakage current shown in Table 6 is significant in view of the fact that the base material is BSTO. Typically, BSTO is considered a type II dielectric, which exhibits leakage over time and temperature. This causes reduced reliability in the part. With the additions of the multiple metal oxides to the base BSTO phase, the reliability of the dielectric increases.

In accordance with an embodiment of the invention, the present materials may be provided in the form of a uniaxially pressed bulk part. Alternatively, large bulk parts of the present materials may be made by isostatic pressing. To press a uniaxial part, the powders may include a conventional binder to help hold the part together. For example, the pressed material may contain a basic acrylic binder in an amount of 2 percent by weight. The powder may be measured, placed in a metal die, and pressed to a pressure between 5,000 and 10,000 psi. In the case of isostatic pressing, the powder may be packed into a molded rubber container. The container is sealed with only a small tube opening. This tube is then attached to a vacuum pump and the air is pumped out of the bag. After the vacuum sealing process is done, the tube is clamped and the bag is placed in a container in an isostatic press. The isostatic press typically uses hydraulic pressure to apply from 30,000 to 60,000 psi of pressure to the part. The green ceramic density may be, for example, approximately 60 percent of theoretical.

In accordance with another embodiment, tape casting techniques may be used to make various types of components comprising the present materials. Tape cast parts may be made by adding a conventional dispersant and solvent system to a jar mill with the powders and liquid mixing media and mixing balls. Dispersion is performed typically from 18 to 24 hours. After the dispersion process, conventional plasticizers and binders are preferably added and the total mixture is mixing for several hours. The resultant tape slurry may then be de-aired by vacuum. At this point, the slurry may be injected into a tape caster and cast. The tape is then dried, cut and sintered. The sintering process typically includes a binder burn out stage and a sintering stage.

Another processing technique is to screen print a film of the present material. For example, powder forms of $BaTiO_3$ and $SrTiO_3$ may be mixed to form the desired stoichiometry. The powders may be ball-milled in either a liquid solvent, deionized water or dry mixed with ceramic grinding media for several hours. These powders are then allowed to dry. The mixed powder may then be calcined to form BSTO. The calcined powder then undergoes another mixing step with the additional metal oxide phase powders in the desired ratios to form the ceramic composite. This mixing may be performed in either a liquid medium or dry. The composite powder is then dried and ground to a workable particle size. At this point, the powder may be mixed in the desired ratio with a screen print binder system which preferably contains a combination of medium and solvent. The ratio of ceramic filler in many cases may be based on a 70 to 75 percent solids loading by weight. The resultant ink may be mixed on a 3-roll mill. However, other mixing methods may be suitable. A typical amount of time for mixing is about 30 minutes. During the mixing process, the powder may be allowed to flow through the mill to allow for uniform mixing. A viscosity test is preferably performed after the ink is made. The viscosities of the inks usually range from 35,000 to 65,000 cps, depending on the screens and the types of patterns which will be printed. Other tests such as rheology tests may be performed as needed depending on the application.

In one embodiment, once the present materials are printed or formed, microwave structures can be placed on top of the films. For example, a varactor may be made by printing a thick film ink of the tunable dielectric onto a substrate by a screen printing process. The dielectric ink may be forced through a wire screen in a pattern that is determined by the screen. The dielectric pattern is then sintered. The substrate then undergoes a conventional lift-off photolithography process and E-beam gold deposition process. The photoresist is then stripped and the patterned gold remains on the substrate. Hundreds of varactors may be made on the substrate. Each of the varactors may be singulated by a dicing saw and each of the varactors can be tested by known techniques.

Other types of thick film structures include vertical capacitors where a metallic layer is printed and fired, then the ceramic is fired on top. The process for making this type of device may be similar to that described for the varactors. The difference is that a film of, e.g., platinum may be placed on the substrate prior to the thick film in order to form a bottom electrode. A subsequent step would be to place a pattern on top of the ceramic substrate. Thin films of these material can also be produced.

The present materials are particularly unique and ideal for microwave component designs because its tuning characteristics allow for the device to have properties that vary. The variation allows for new concepts in design for filters which can vary the frequency of operation, for antennas to scan and track satellites electronically, and it allows for frequency hopping of microwave devices as well as many other applications. This unique property can be used to build tunable devices for RF, microwave, and mill-wave applications. These tunable devices include varactors (variable capacitors), tunable filters, phase shifters, tunable delay lines, VCO (voltage controlled oscillators), tunable dielectric resonators, tunable impedance-matching devices, and the like.

In accordance with an embodiment of the invention, the present materials may be incorporated in phased array antennas which are compact, light and relatively inexpensive to make and operate. The tunable dielectric materials can be used as replacements for the more expensive and high power driven ferrites currently used in large scale phased arrays. The present materials are also much more compact, and may be cheaper than materials used in mechanically scanning antennas. The present materials also have the advantage of lower loss without amplification than semiconductor tunable devices at microwave frequencies.

One of the applications of the present materials is to build high performance and low cost dielectric phase shifters. The phase of the dielectric phase shifters can be controlled by changing dielectric constant through biasing the tunable materials. The dielectric phase shifters can be in many configurations such as planar structures (microstrip line, coplanar), and 3-D structures (rectangle waveguide, finline) to meet different application requirements. The dielectric phase shifters have wide operation frequency range, low insertion loss, low consumption power, low intermodulation distortion and low cost, compared to common used ferrite and semiconductor-based phase shifters. Since phase shifters are a key device in a phased array antenna in both performance and cost of the whole antenna, the performance and cost of the antenna may be significantly improved by using the dielectric phase shifters instead of ferrite and semiconductor phase shifters.

Another application field of the present tunable materials is tunable filters. A tunable filter-consists of one or more resonators. Each resonator has a inductor-capacitor (LC) resonating circuit. A filter can be tuned by changing inductance and/or capacitance of the resonator. Since the capacitance of the resonator can be easily changed by using the multi-phase tunable materials of the present invention, a low cost, high performance and compact tunable filter is achievable.

The dielectric tunable filters can find many applications in communication systems. Most current communication system use fixed filters. However, future communications require wideband communications using frequency-hopping techniques, so that large amounts of digital data can be transferred over the band. A critical component for these applications is a low cost fast-acting tunable filter. Current tunable filters cannot meet the requirements in both performance and cost. Digital data could be distributed or encoded over a band of frequencies in a sequence determined by controlling circuitry of the tunable filter. This would allow for several users to transmit and receive over a common range of frequencies.

The materials of the present invention provide increased tuning characteristics, very stable structure with applied voltage, good loss characteristics, good temperature stability, and adjustable dielectric constant with desired tuning and loss. The present materials enable many new applications in broadband wireless communications that are currently not possible. In addition, the materials allow for components and antennas to be built at a low cost so that traditionally expensive products can be affordable to individuals, such as phased array antennas and tunable filters.

Whereas particular embodiments of this invention have been described above for purposes of illustration, it will be evident to those skilled in the art that numerous variations of the details of the present invention may be made without departing from the invention as defined in the appended claims.

What is claimed is:

1. A method of making an electronically tunable dielectric material comprising:
    mixing particles of at least one electronically tunable dielectric material including barium strontium titanate and a total of from about 1 to about 80 weight percent of particles of at least two additional metal oxide materials, wherein the at least two additional metal oxide materials are selected from a group consisting of $WO_3$, $SnTiO_4$, $ZrTiO_4$, $CaSiO_3$, $CaWO_4$, $CaZrO_3$, PbO, and $Bi_2O_3$;
    sintering the mixed particles, wherein the electronically tunable dielectric particles and the additional metal oxide particles have average particle sizes of from about 0.1 to about 5 micron, wherein the two additional metal oxide phases have a weight ratio of from about 1:100 to about 100:1;
    forming the electronically tunable dielectric material from the sintered mixed particles;
    measuring a dielectric constant, a tunability and a dielectric loss for the electronically tunable dielectric material;
    adjusting an amount of only one metal oxide material of the at least two additional metal oxide materials for the mixing step;
    repeating the mixing, sintering, forming, measuring and adjusting steps to change the dielectric constant of the electronically tunable dielectric material to a desired dielectric constant while maintaining the tunability and the dielectric loss of the electronically tunable dielectric material substantially the same.

2. The method of claim 1, wherein the at least one electronically tunable dielectric material particles and the at least two additional metal oxide materials particles have average particle sizes of from about 1.5 to about 2.5 micron, and wherein an insertion loss for the at least one electronically tunable dielectric material is less than 0.02 for a frequency of 10 GHz.

3. The method of claim 1, wherein the mixing particles of at least one electronically tunable dielectric material including barium strontium titanate and a total of from about 1 to about 80 weight percent of particles of at least two additional metal oxide materials is performed in a liquid medium, and wherein the at least two additional metal oxide materials comprise a total of from about 3 to about 65 weight percent.

4. The method of claim 1, wherein the forming of the at least one electronically tunable dielectric material comprises isostatic pressing.

5. The method of claim 1, wherein the at least two additional metal oxide materials comprise a total of from about 10 to about 50 weight percent.

6. The method of claim 1, wherein the at least two additional metal oxide materials have a weight ratio of from about 1:10 to about 10:1.

7. The method of claim 1, wherein the at least two additional metal oxide materials have a weight ratio of from about 1:5 to about 5:1.

8. The method of claim 1, wherein the barium strontium titanate is of the formula $Ba_xSr_{1-x}TiO_3$, where x is from about 0.15 to about 0.6.

9. The method of claim 1, wherein the mixing of the particles is in a liquid solvent, and further comprising:
grinding the mixture of the particles to desired particle sizes, and
adding a screen printing binder to provide a viscosity between 35,000 cps to 65,000 cps.

10. The method of claim 1, wherein the at least two additional metal oxide materials do not include Al, Zr and Si.

11. The method of claim 1, wherein the dielectric constant of the formed electronically tunable dielectric material is between 300 to 400 or between 800 to 1000.

12. The method of claim 11, wherein the at least two additional metal oxide materials further comprise a third metal oxide material that is an Mg-free compound.

13. The method of claim 12, wherein the Mg-free compound comprises an oxide of a metal selected from Si, Ca, Zr, Ti and Al.

14. The method of claim 12, wherein the Mg-free compound comprises a rare earth oxide.

15. The method of claim 1, further comprising mixing the formed electronically tunable dielectric material with a polymeric binder to enable screen printing.

16. The method of claim 15, wherein the mixing of the particles is in a liquid solvent.

17. The method of claim 1, wherein the mixing is performed without adding binders to the particles of the at least one electronically tunable dielectric material and the at least two additional metal oxide materials.

18. A method of making an electronically tunable dielectric material comprising:
mixing particles of at least one electronically tunable dielectric material and a total of from about 1 to about 80 weight percent of particles of at least two additional metal oxide materials, wherein the at least two additional metal oxide materials comprise $CaTiO_3$ and a metal oxide selected from a group consisting of $WO_3$, $SnTiO_4$, $ZrTiO_4$, $CaSiO_3$, $CaWO_4$, $CaZrO_3$, PbO, and $Bi_2O_3$;
sintering the mixed particles, wherein the electronically tunable dielectric particles and the additional metal oxide particles have average particle sizes of from about 0.1 to about 5 micron, wherein the two additional metal oxide phases have a weight ratio of from about 1:100 to about 100:1;
forming the electronically tunable dielectric material from the sintered mixed particles;
measuring a dielectric constant, a tunability and a dielectric loss for the electronically tunable dielectric material;
adjusting an amount of only one metal oxide material of the at least two additional metal oxide materials for the mixing step;
repeating the mixing, sintering, forming, measuring and adjusting steps to change the dielectric constant of the electronically tunable dielectric material to a desired dielectric constant while maintaining the tunability and the dielectric loss of the electronically tunable dielectric material substantially the same.

19. The method of claim 18, wherein the at least one electronically tunable dielectric material is barium strontium titanate, wherein the electronically tunable dielectric particles and the additional metal oxide particles have average particle sizes of from about 1.5 to about 2.5 micron, wherein the forming of the electronically tunable dielectric material comprises one of uniaxially pressing or isostatic pressing, and wherein the at least two additional metal oxide materials comprise a third additional metal oxide material selected from a group consisting of $SnTiO_4$, $ZrTiO_4$, $CaSiO_3$, $CaSnO_3$, wherein the at least one electronically tunable dielectric material does not include barium strontium titanate.

20. The method of claim 18, wherein the at least two additional metal oxide materials comprise a total of from about 3 to about 65 weight percent of the material, and wherein the at least one electronically tunable dielectric material does not include barium strontium titanate.

21. The method of claim 18, wherein the at least two additional metal oxide materials comprise a total of from about 5 to about 60 weight percent of the material.

22. The method of claim 18, wherein the at least two additional metal oxide materials comprise a total of from about 10 to about 50 weight percent of the material.

23. A method of making an electronically tunable dielectric material comprising:
mixing particles of at least one electronically tunable dielectric material including barium strontium titanate with particles of at least two additional metal oxide materials having a total of from 1 to 80 weight percent, wherein the at least two additional metal oxide materials comprise $CaTiO_3$ and a metal oxide selected from a group consisting of $SnTiO_4$, $ZrTiO_4$, $CaSiO_3$, and $CaZrO_3$;
sintering the mixed particles, wherein the electronically tunable dielectric particles and the at least two additional metal oxide particles have average particle sizes of from about 0.1 to about 5 micron, wherein the two additional metal oxide phases have a weight ratio of from about 1:100 to about 100:1;
forming the electronically tunable dielectric material from the sintered mixed particles;
measuring a dielectric constant, a tunability and a dielectric loss for the electronically tunable dielectric material;
adjusting an amount of only one metal oxide material of the at least two additional metal oxide materials for the mixing step;
repeating the mixing, sintering, forming, measuring and adjusting steps to change the dielectric constant of the electronically tunable dielectric material to a desired dielectric constant while maintaining the tunability and the dielectric loss of the electronically tunable dielectric material substantially the same.

24. The method of claim 23, wherein the at least two additional metal oxide materials do not include Al, Zr and Si.

25. The method of claim 24, further comprising pressing the sintered mixed particles at a pressure between 5 kpsi and 10 kpsi using an acrylic binder of 2 percent by weight, wherein the mixing of the particles is in a liquid solvent, and further comprising:
grinding the mixture of the particles to desired particle sizes, and adding a screen printing binder to provide a viscosity between 35,000 cps to 65,000 cps.

26. The method of claim 23, further comprising mixing the sintered mix with at least a solvent to form an ink having a viscosity between 35 kcps and 65 kcps.

* * * * *